United States Patent [19]
Watanabe et al.

[11] Patent Number: 4,998,231
[45] Date of Patent: Mar. 5, 1991

[54] MAGNETO-OPTICAL DISK RECORDING APPARATUS

[75] Inventors: Tetsu Watanabe, Tokyo; Hiroshi Ogawa, Kanagawa, both of Japan

[73] Assignee: Sony Corporation, Tokyo, Japan

[21] Appl. No.: 447,867

[22] Filed: Dec. 8, 1989

[30] Foreign Application Priority Data

Dec. 29, 1988 [JP] Japan .................................. 63-333685

[51] Int. Cl.⁵ ...................... G11B 13/04; G11B 11/12; G11B 11/10
[52] U.S. Cl. ...................................... 369/13; 369/116; 369/121; 360/59; 360/114
[58] Field of Search .................. 369/13, 116, 121, 124, 369/275.1; 360/59, 114; 365/122

[56] References Cited

U.S. PATENT DOCUMENTS

| 4,558,440 | 12/1985 | Tomita | 360/59 X |
| 4,598,393 | 7/1986 | Pierce et al. | 369/275.3 X |
| 4,712,203 | 12/1987 | Saito et al. | 360/59 X |
| 4,907,211 | 3/1990 | Horimai et al. | 360/59 X |

FOREIGN PATENT DOCUMENTS 57-133503  8/1982  Japan .................................. 369/13

Primary Examiner—Stuart S. Levy
Assistant Examiner—Hoa Nguyen
Attorney, Agent, or Firm—Lewis H. Eslinger

[57] ABSTRACT

A magneto-optical disk recording apparatus sequentially pulse-drive a plurality of semiconductor laser elements in a time-divisional manner so that spots of light are sequentially formed along a plurality of recording tracks of a magneto-optical disk with clock information recorded in advance along a plurality of recording tracks thereon. A magnetic modulating signal is generated by combining pieces of information desired to be recorded along the plurality of recording tracks so that a modulating magnetic field whose polarity is reversed in accordance with the magnetic modulating signal is applied to the plurality of recording tracks by means of a magnetic head.

8 Claims, 2 Drawing Sheets

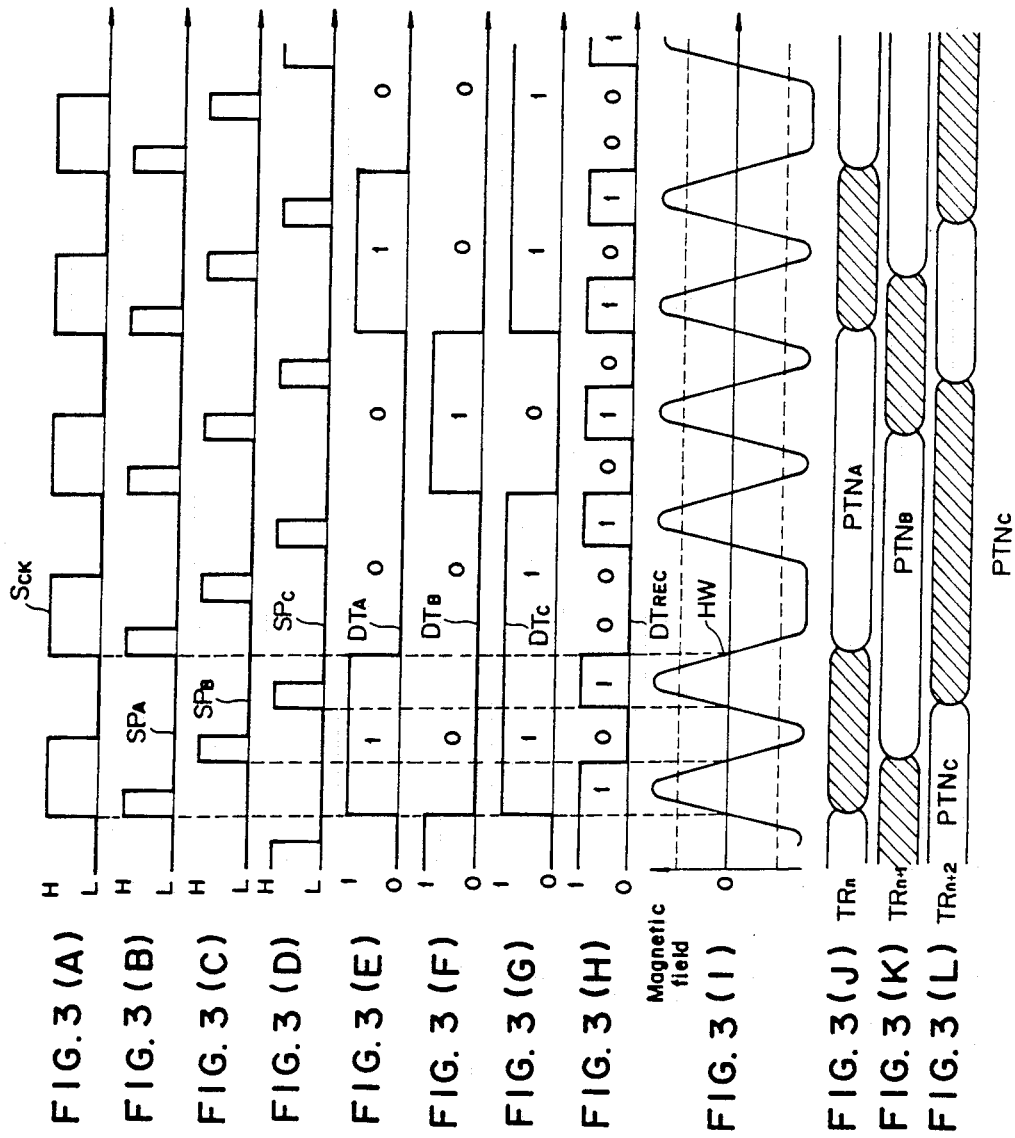

MAGNETO-OPTICAL DISK RECORDING APPARATUS

BACKGROUND OF THE INVENTION

1. Field of the Invention

The present invention relates to a magneto-optical disk recording apparatus and more particularly to a magneto-optical disk recording apparatus capable of overwriting along a plurality of recording tracks using a plurality of laser beams emitted from a plurality of laser beam sources.

2. Description of the Prior Art

In a prior art magneto-optical disk recording apparatus, information desired to be recorded is magnetically recorded making use of the property of a magneto-optical disk comprising a perpendicular magnetic film with a perpendicular magnetic anisotropy exhibiting a great change in its magnetization characteristics when it is heated beyond the Curie temperature $T_C$.

More particularly, the perpendicular magnetic film on a magneto-optical disk has such a magnetization characteristic that its coercive force $H_C$ sharply decreases at the Curie temperature $T_C$, and hence, by applying an external magnetic field to the perpendicular magnetic film in its state first heated above the Curie temperature $T_C$ and then cooling the magneto-optical disk below the Curie temperature $T_C$, the direction of magnetization in the perpendicular magnetic film can be aligned along the direction of the external magnetic field.

Based upon such principle of magnetization, in a magneto-optical disk recording apparatus of a magnetic field modulation type capable of the so-called overwrite, i.e., writing in new information while destroying information in a memory location, a light beam is continuously thrown on the magneto-optical disk to scan it with a spot of the beam to thereby heat a predetermined region of it above Curie temperature $T_C$, and at the same time, a modulating magnetic field whose polarity reverses according to information to be recorded and which is timed by a reference clock is applied to the region using a magnetic head.

Through such operation, the region irradiated by the light spot and heated above the Curie temperature $T_C$ is naturally cooled when the light spot moves past it, and then, the region, when it is cooled below the Curie temperature $T_C$, remains magnetized in the direction of the modulating magnetic field that was applied thereto.

Thus, micro regions aligned along the direction of the modulating magnetic field are sequentially formed on the magneto-optical disk along the locus scanned by the light spot, even if there is already formed a magnetic pattern, in synchronism with the cycle of the reference clock, and thereby, the overwrite of the information desired to be recorded on the magneto-optical disk is achieved.

In such a magneto-optical disk recording apparatus of a magnetic field modulation type, when it is intended to increase recording and reproducing speed of the record information (the so-called transfer rate), it is considered desirable to modulate the magnetic head at a higher frequency.

When it is tried to put the above idea into practice, however, it becomes difficult to have a sufficient length of time to cool the magneto-optical disk and hence a bit error of record information occurs, thus making it difficult to put that idea into practice.

Therefore, in a magneto-optical disk recording apparatus of a light modulation recording type, as it is called, in which a light beam is ON-OFF modulated according to record information while the magneto-optical disk is subjected to a recording magnetic field with a fixed direction of magnetization, there is proposed an apparatus enabled to provide an increased transfer rate of the record information employing the so-called multi-beam system.

More particularly, in such a magneto-optical disk recording apparatus of a multi-beam system, the laser beam source is formed of a plurality of semiconductor laser elements in a hybrid or a monolithic arrangement, whereby a plurality of light beams independently modulated according to the respective pieces of information to be recorded are emitted to irradiate a plurality of adjoining recording tracks on the magneto-optical disk through a common optical system.

Thus, it is designed to offer an increased transfer rate of the record information by the capability of recording, and reproducing, the information along the plurality of recording tracks at, practically, the same time.

However, since the recording magnetic field of a fixed direction of magnetization is adapted to be applied to the magneto-optical disk in the above case, it is required to perform an erasing process along the recording track prior to the recording of information. Accordingly, an additional processing time is required. Therefore, it has not been advantageous to put this design into practice.

SUMMARY OF THE INVENTION

The present invention was made in view of the above mentioned problems and it is a primary object of the present invention to provide a magneto-optical disk recording apparatus of a multi-beam type that is simple in structure and yet capable of overwriting.

To solve the above mentioned problems, it is arranged in the present invention such that a plurality of laser beam sources 6 (6A, 6B, 6C) are sequentially pulse-driven in a time-divisional manner so that a plurality of light spots $SP_A$, $SP_B$, $SP_C$ are sequentially formed along a plurality of recording tracks $TR_n$, $TR_{n+1}$, $TR_{n+2}$ on a magneto-optical disk 4, and in the meantime, a magnetic modulating signal $DT_{REC}$ is formed by combining pieces of information $DT_A$, $DT_B$, $DT_C$ to be recorded along the plurality of recording tracks $TR_n$, $TR_{n+1}$, $TR_{n+2}$ in a time-divisional manner, and thereupon, a modulating magnetic field HW whose polarity is reversed according to the magnetic modulating signal $DT_{REC}$ is applied by a magnetic head 17 to the plurality of recording tracks $TR_n$, $TR_{n+1}$, $TR_{n+2}$.

While the light spots $SP_A$, $SP_B$, $SP_C$ are sequentially formed along the plurality of recording tracks $TR_n$, $TR_{n+1}$, $TR_{n+2}$ on the magneto-optical disk 4, the modulating magnetic field HW whose polarity is reversed in accordance with the magnetic modulating signal $DT_{REC}$ is applied to the plurality of recording tracks $TR_n$, $TR_{n+1}$, $TR_{n+2}$, and therefore, record patterns $PTN_A$, $PTN_B$, $PTN_C$ corresponding to the information desired to be recorded $DT_A$, $DT_B$, $DT_C$ are formed along the plurality of recording tracks $TR_n$, $TR_{n+1}$, $TR_{n+2}$.

BRIEF DESCRIPTION OF THE DRAWINGS

FIG. 3 (A-L) are timing charts useful for explaining operations in a magneto-optical disk recording apparatus of an embodiment.

DESCRIPTION OF THE PREFERRED EMBODIMENTS

An embodiment of the present invention will be described below with reference to the accompanying drawings.

Figure 1:
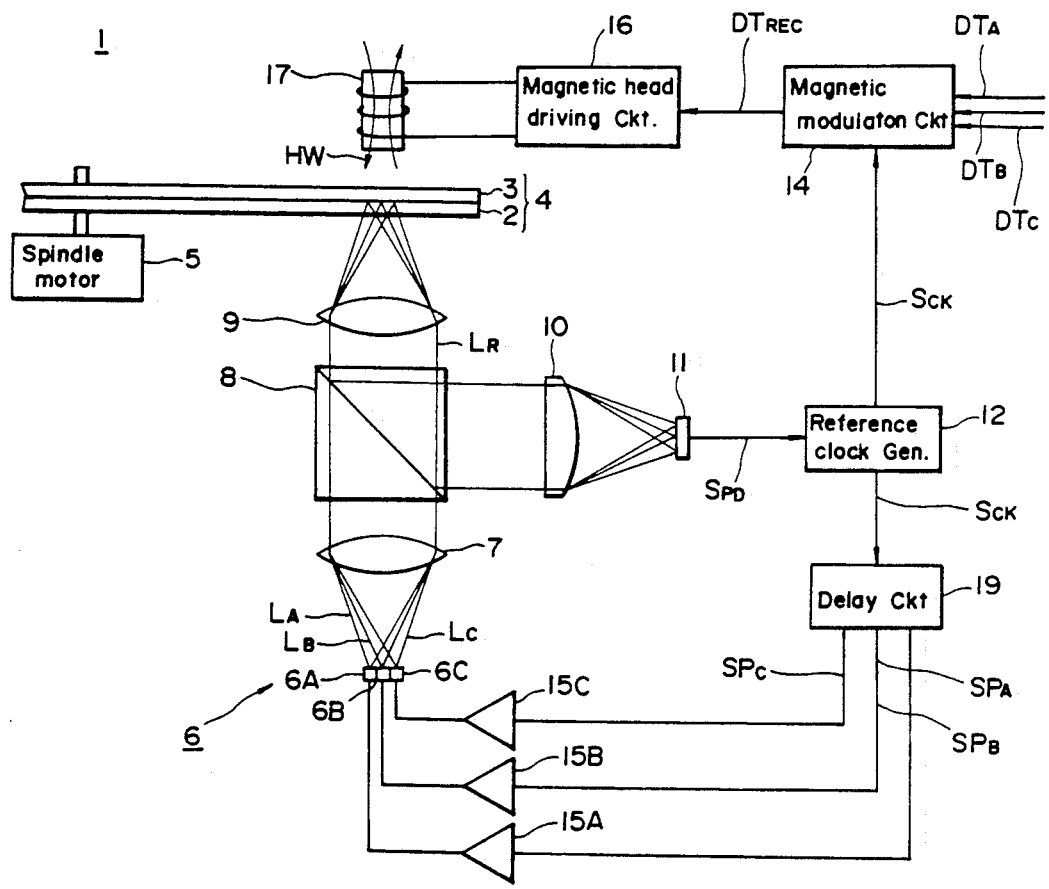
FIG. 1 is a schematic system diagram showing an embodiment of the present invention.

Referring to FIG. 1, reference numeral 1 denotes the whole of a magneto-optical disk recording apparatus, in which it is arranged such that a magneto-optical disk 4 formed of a transparent protecting substrate 2 of polycarbonate, glass, or the like with a perpendicular magnetic film 3 deposited thereon by sputtering or the like is driven by a spindle motor 5 to rotate at a predetermined rotating speed.

In the case of the present magneto-optical disk recording apparatus 1, a laser beam source 6 is formed of three semiconductor laser elements 6A, 6B, 6C in a hybrid or monolithic arrangement.

Figure 2:
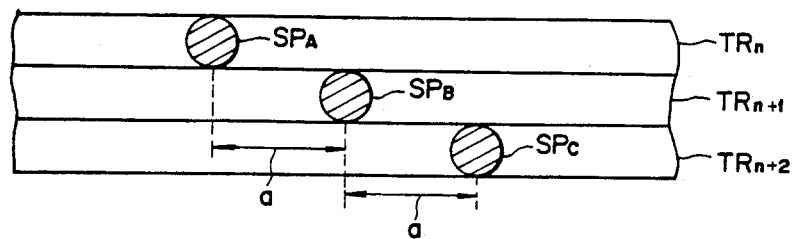
FIG. 2 is a schematic diagram useful for explaining light spots irradiating recording tracks in the above system.

Thereby, three light beams $L_A$, $L_B$, $L_C$ emitted from the laser beam source 6 are thrown on a plurality of adjoining three recording tracks $TR_n$, $TR_{n+1}$, $TR_{n+2}$ of the magneto-optical disk 4 as shown in FIG. 2 through a common optical system comprising a collimator lens 7, a beam splitter 8, and an objective lens 9 so that light spots $SP_A$, $SP_B$, $SP_C$ are formed at intervals of a distance a (=50 to 200 μm).

On the magneto-optical disk 4, there are previously recorded clock information, servo information, and the like in a sample servo format system. In the magneto-optical disk recording apparatus 1, light beams $L_R$ reflected from the magneto-optical disk 4 are bent by the beam splitter 8 and received by a photodetector 11 through an analyzer 10 and the thus obtained photo-detected output $S_{PD}$ is delivered to a reference clock generator 12.

Thereupon, the reference clock generator 12 generates a reference clock $S_{CK}$ (FIG. 3(A)) based on the clock information included in the photo-detected output $S_{PD}$ and delivers the same to a delay circuit 13 for a laser driving system and a magnetic modulation circuit 14 for a magnetic head driving system.

The delay circuit 13, first, in response to the reference clock $S_{CK}$, generates a first laser driving pulse $SP_A$ (FIG. 3(B)) which rises at the timing of leading edge of the reference clock $S_{CK}$ and has, for example, the pulse duration about one-sixth the clock period.

The delay circuit 13 further generates second and third laser driving pulses $SP_B$ and $SP_C$ (FIG.3(C) and (D)), which sequentially rise at intervals of one-third the clock period of delay from the first laser driving pulse $SP_A$, and these laser driving pulses are supplied to the semiconductor laser elements 6A, 6B, 6C of the laser beam source 6 through first, second, and third laser driving circuits 15A, 15B, and 15C, respectively.

Thus, the light spots $SP_A$, $SP_B$, $SP_C$ are thrown on the magneto-optical disk 4 at predetermined positions along the sequentially adjoining three recording tracks $TR_n$, $TR_{n+1}$, $TR_{n+2}$ for a period of time sufficient to heat the perpendicular magnetic film 3 of the magneto-optical disk 4 above the Curie temperature $T_C$ in a time-divisional manner during one clock period of the reference clock $S_{CK}$.

Meanwhile, the magnetic modulation circuit 14 for the magnetic head driving system is supplied with the reference clock $S_{CK}$ and, at the same time, supplied with first, second, and third recording data $DT_A$, $DT_B$, and $DT_C$ (FIG. 3(E), (F), and (G)) to be written along three recording tracks $TR_n$, $TR_{n+1}$, $TR_{n+2}$ at the timing synchronized with the reference clocks $S_{CK}$ from, for example, a recording information processing circuit (not shown).

Thereupon, the magnetic modulation circuit 14 sequentially and cyclically combines the first, second, and third recording data $DT_A$, $DT_B$, and $DT_C$, with each thereof allotted one-third the clock period, to thereby form a magnetic head driving data $DT_{REC}$ (FIG. 3(H)) and supplies it to the magnetic head 17 structured of an electromagnet through a magnetic head driving circuit 16.

Thus, the magnetic head 17 applies a modulating magnetic field HW (FIG. 3(I)) whose polarity is reversed according to the magnetic head driving data $DT_{REC}$ at three times as high a frequency as the reference clock $S_{CK}$ onto three recording tracks $TR_n$, $TR_{n+1}$, $TR_{n+2}$.

Thus, in the magneto-optical disk recording apparatus 1 such that, the modulating magnetic field HW whose polarity is reversed according to the value of the magnetic head driving data $DT_{REC}$ is applied to the three recording tracks $TR_n$, $TR_{n+1}$, $TR_{n+2}$ where the light spots $SP_A$, $SP_B$, $SP_C$ have been formed sequentially, and therefore, it is made possible to overwrite, virtually at the same time, the record patterns $PTN_A$, $PTN_B$, $PTN_C$ (FIG. 3(J), (K), (L)) based on the first, second, and third recording data $DT_A$, $DT_B$, $DT_C$ along the three recording tracks $TR_n$, $TR_{n+1}$, $TR_{n+2}$.

In the case of the present embodiment, if the rotating speed of the magneto-optical disk 4 is set to 3600 rpm and the reference clock $S_{CK}$ is set to 15 MHz, the period of the reference clock $S_{CK}$ becomes 67 ns.

Against this, if the pulse duration of the laser driving pulse $SP_A$, $SP_B$, $SP_C$ is set to about 20 ns, the light spots $SP_A$, $SP_B$, $SP_C$ can be kept on for the period of time necessary for heating the perpendicular magnetic film 3 of the magneto-optical disk 4 above the Curie temperature $T_C$. Then, the modulating magnetic field HW is set to keep the magnetic field applied for about 15 ns, while the minimum period required for keeping the magnetic field for orienting the magnetization in the perpendicular magnetic film 3 in a specific direction is 10 ns, and thereby, it is ensured that overwrite can be achieved correctly.

The hatched portions in the record patterns $PTN_A$, $PTN_B$, $PTN_C$ in FIG. 3 indicate the regions where the perpendicular magnetic film is magnetized, for example, in the upward direction representing a value "1" and the open portions conversely indicate the regions where the perpendicular magnetic film is magnetized, for example, downward representing a value "0".

In the above described arrangement, three semiconductor laser elements 6A, 6B, and 6C are sequentially pulse-driven in a time-divisional manner the thereby sequentially form light spots $SP_A$, $SP_B$, $SP_C$ along three recording tracks $TR_n$, $TR_{n+1}$, $TR_{n+2}$ on a magneto-optical disk 4, and a modulating magnetic field HW whose polarity is reversed depending on the value of magnetic head driving data $DT_{REC}$ obtained by combining three recording data $DT_A$, $DT_B$, $DT_C$ to be recorded along three recording tracks $TR_n$, $TR_{n+1}$, $TR_{n+2}$ in a time-divisional manner is applied to the aforesaid light spots, and thus it is made possible to provide a magneto-optical disk recording apparatus 1 in a simple structure and capable of achieving overwrite using multiple beams.

Although the case was described, in relation to the above embodiment, where data to be recorded along three recording tracks were combined in a time-divisional manner for forming the magnetic head driving data, the present invention is not limited to that, but various modulating system may be used. For example, desired information to be recorded may be divided so as to be recorded along three recording tracks.

Although the case was described, in relation to the above embodiment, where three laser beams emitted from three semiconductor laser elements were thrown on a magneto-optical disk along adjoining three recording tracks, the present invention is not limited to that, but the same effect may be obtained even if the laser beams are arranged to irradiate three tracks at intervals of one or more tracks by having the modulating magnetic field applied to the same three recording tracks at the same time.

Although the case was described, in relation to the above embodiment, where three laser beams emitted from three semiconductor laser elements were arranged to irradiate three recording tracks to thereby achieve overwrite using multiple beams, the present invention is not limited to the above, but multiple beams emitted from two or four semiconductor laser elements or above may be arranged to irradiate their corresponding multiple recording tracks for achieving overwrite.

According to the present invention as described in the foregoing, it is arranged such that a plurality of laser beam sources are sequentially pulse-driven in a time-divisional manner so that light spots are sequentially formed along a plurality of recording tracks on a magneto-optical disk, and a modulating magnetic field whose polarity is reversed according to a magnetic modulating signal, which is formed by combining in a time-divisional manner pieces of information desired to be recorded along the plurality of recording tracks, is applied to the plurality of recording tracks, and thereby, it is made possible to provide a magneto-optical disk recording apparatus in a simple structure and yet capable of overwriting along a plurality of recording tracks.

By such arrangement, it is made possible to provide a magneto-optical disk recording apparatus in which transfer rate of record information is greatly improved.

What is claimed is:

1. A magneto-optical disk recording apparatus comprising:
   a plurality of laser beam sources;
   an optical system for focusing light beams for said laser beam sources on a plurality of recording tracks of a magneto-optical disk;
   driving means for sequentially pulse-driving said laser beam sources in a time-divisional manner;
   magnetic modulating signal generating means for generating a magnetic modulating signal by combining data desired to be recorded along said plurality of recording tracks in said time-divisional manner; and
   external magnetic field generating means for applying to said plurality of recording tracks a modulating magnetic field whose polarity is reversed in accordance with said magnetic modulated signal.

2. A magneto-optical disk recording apparatus according to claim 1 wherein at least one of said recording tracks is provided with clock information recorded along the same in advance.

3. A magneto-optical disk recording apparatus according to claim 1 further comprising detection means receiving beams reflected from said magneto-optical disk and generating a clock information signal, and reference clock generating means responsive to said clock information signal for generating a reference clock for timing said driving means and said magnetic modulating signal generating means.

4. A magneto-optical disk recording apparatus according to claim 2 wherein said reference clock has a clock period and said magnetic modulating signal generating means
   produces a plurality of data to be recorded in synchronism with said reference clock,
   sequentially and cyclically combines said plurality of data to be recorded, each thereof being allotted a predetermined fraction of the clock period, and
   delivers the combined data to said external magnetic field generating means.

5. A magnetic-optical disk recording apparatus according to claim 2 wherein said magnetic modulating signal generating means
   produces a plurality of data to be recorded in synchronism with said reference clock,
   sequentially and cyclically combines said plurality of data to be recorded, each thereof being allotted a different one-third of the clock period, and
   delivers the combined data to said external magnetic field generating means.

6. A magneto-optical disk recording apparatus according to claim 2 wherein said driving means generates a plurality of driving pulses for respectively driving said laser beam sources.

7. A magneto-optical disk recording apparatus according to claim 6 wherein said reference clock has a clock period and said driving means generates a driving pulse serving as a reference pulse rising when said reference clock rises and plurality of additional driving pulses rising so as to sequentially follow said reference pulse with respective delays of predetermined fractions of the clock period.

8. A magneto-optical disk recording apparatus according to claim 6 wherein said reference clock has a clock period and said driving means is adapted to generate a first driving pulse rising when said reference clock rises and a second driving pulse and a third driving pulse respectively rising so as to sequentially follow said first driving pulse with delays of one-third and two-thirds of the clock period.

* * * * *

UNITED STATES PATENT AND TRADEMARK OFFICE
CERTIFICATE OF CORRECTION

PATENT NO. : 4,998,231

DATED : March 5, 1991

INVENTOR(S) : Tetsu Watanabe, Hiroshi Ogawa

It is certified that error appears in the above-identified patent and that said Letters Patent is hereby corrected as shown below:

Fig. 1, change the reference numeral identifying the delay circuit from "19" to --13-- (according to Request for Drawing Corrections dated 1-22-90)

Line 2, change "pulse-drive" to --pulse-drives--
Col. 1, line 40, after "above" insert --the--
Col. 2, line 52, change "time -divisional" to --time-divisional--
Col. 4, line 11, change "clocks" to --clock--
       line 28, delete "such that"
       line 60, after "magnetized" change "." to --,--
       line 64, change "the" to --to--

UNITED STATES PATENT AND TRADEMARK OFFICE
CERTIFICATE OF CORRECTION

PATENT NO. : 4,998,231

DATED : March 5, 1991

INVENTOR(S) : Tetsu Watanabe, Hiroshi Ogawa

It is certified that error appears in the above-identified patent and that said Letters Patent is hereby corrected as shown below:

Col. 6, line 23, change "claim 2" to --claim 3-- line 34, change "claim 2" to --claim 3-- line 44, change "claim 2" to --claim 3--

Signed and Sealed this

Thirteenth Day of October, 1992

Attest:

DOUGLAS B. COMER

*Attesting Officer*    *Acting Commissioner of Patents and Trademarks*